(12) United States Patent
Schlicht (10) Patent No.: US 6,949,854 B1
(45) Date of Patent: Sep. 27, 2005

(54) METHOD AND APPARATUS FOR A CONTINUOUSLY VARIABLE-RATIO TRANSMISSION

(76) Inventor: Michael Schlicht, 1566 Barberry Ct., San Jose, CA (US) 95121

( * ) Notice: Subject to any disclaimer, the term of this patent is extended or adjusted under 35 U.S.C. 154(b) by 0 days.

(21) Appl. No.: 10/099,280

(22) Filed: Mar. 15, 2002

Related U.S. Application Data (60) Provisional application No. 60/276,754, filed on Mar. 16, 2001.

(51) Int. Cl.$^7$ .......... H02K 49/00; H00K 5/16; H02D 15/00; B60K 6/04
(52) U.S. Cl. .......... 310/103; 310/92; 310/83; 476/175; 476/9; 476/4; 162/262; 162/210; 464/29
(58) Field of Search .......... 310/103, 92, 40 R, 310/10, 83; 162/262, 210; 475/210, 175; 464/29; 476/4, 9, 175; 477/175

(56) References Cited

U.S. PATENT DOCUMENTS

| | | | | |
|---|---|---|---|---|
| 2,972,905 A | * | 2/1961 | Bullard, III .......... 475/81 |
| 3,280,646 A | * | 10/1966 | Lemieux .......... 477/50 |
| 3,378,710 A | * | 4/1968 | Martin, Jr. .......... 310/104 |
| 3,649,137 A | * | 3/1972 | Laing .......... 417/420 |
| 3,826,938 A | * | 7/1974 | Filer .......... 310/104 |
| 3,992,132 A | * | 11/1976 | Putt .......... 417/271 |
| 4,015,695 A | * | 4/1977 | Pope .......... 188/181 A |
| 4,163,914 A | * | 8/1979 | Keyes .......... 310/103 |
| 4,192,200 A | * | 3/1980 | McCoin .......... 475/215 |
| 4,197,934 A | * | 4/1980 | Matsui et al. .......... 198/465.1 |
| 4,364,459 A | * | 12/1982 | Futehally .......... 477/175 |
| 4,459,868 A | | 7/1984 | Sargent .......... 476/4 |
| 4,463,841 A | | 8/1984 | Kelley .......... 192/18 A |
| 4,563,914 A | * | 1/1986 | Miller .......... 475/80 |
| 4,593,218 A | * | 6/1986 | Streeter .......... 310/103 |
| 4,649,307 A | * | 3/1987 | Bech .......... 310/99 |
| 4,684,836 A | * | 8/1987 | Hart .......... 310/83 |
| 4,684,911 A | * | 8/1987 | Streeter .......... 335/288 |
| 4,715,482 A | * | 12/1987 | Watanabe et al. .......... 477/175 |
| 4,770,061 A | * | 9/1988 | Martinez .......... 475/154 |
| 4,773,517 A | * | 9/1988 | Watanabe .......... 477/175 |
| 4,824,419 A | * | 4/1989 | Kumm .......... 474/29 |
| 4,936,165 A | | 6/1990 | Doyle et al. .......... 475/72 |
| 5,013,949 A | | 5/1991 | Mabe, Jr. .......... 310/83 |
| 5,142,926 A | | 9/1992 | Huang .......... 476/9 |
| 5,152,191 A | * | 10/1992 | Sato et al. .......... 477/36 |
| 5,270,600 A | * | 12/1993 | Hashimoto .......... 310/75 D |
| 5,281,880 A | * | 1/1994 | Sakai .......... 310/115 |
| 5,281,932 A | | 1/1994 | Even-Or .......... 333/32 |
| 5,346,155 A | * | 9/1994 | Alexander et al. .......... 242/334 |
| 5,362,287 A | | 11/1994 | Tanaka et al. .......... 477/175 |
| 5,477,093 A | * | 12/1995 | Lamb .......... 310/75 D |

(Continued)

FOREIGN PATENT DOCUMENTS

EP          1059473 A2 *  12/2000   .......... F16H 61/38

(Continued)

OTHER PUBLICATIONS

Bill Visnic, "Technology; Tech & Trends: Nissan Producing Amazing New CVT," *Ward's Auto World*, Dec. 1999 pNA, 2 pps.

(Continued)

*Primary Examiner*—Karl Tamai
*Assistant Examiner*—Pedro J. Cuevas (57) ABSTRACT

A method and apparatus for providing a continuously variable transmission (CVT) is described. The CVT comprises permanent magnets to couple power, a coefficient of coupling controlled by an electronic servo control loop. Wherein torque multiplication is achieved by "duty-cycle" modulation of the magnetic coupling "pulses", between the input shaft and output shaft.

18 Claims, 6 Drawing Sheets

1 Input Shaft
2 Output Shaft
3 Moving Magnets
4 Fixed Magnets

U.S. PATENT DOCUMENTS

| | | | | | |
|---|---|---|---|---|---|
| 5,477,094 | A | * | 12/1995 | Lamb | 310/75 D |
| 5,505,285 | A | * | 4/1996 | Organek | 192/35 |
| 5,523,636 | A | * | 6/1996 | Nelson | 310/103 |
| 5,568,516 | A | | 10/1996 | Strohallen et al. | 375/259 |
| 5,569,108 | A | * | 10/1996 | Cadee et al. | 475/1 |
| 5,615,229 | A | | 3/1997 | Sharma et al. | 375/259 |
| 5,631,829 | A | * | 5/1997 | Takasaki et al. | 701/69 |
| 5,668,424 | A | * | 9/1997 | Lamb | 310/103 |
| 5,739,611 | A | * | 4/1998 | Suzuki et al. | 310/103 |
| 5,762,156 | A | | 6/1998 | Bates et al. | 180/165 |
| 5,774,791 | A | | 6/1998 | Strohallen et al. | 455/41.1 |
| 5,812,598 | A | | 9/1998 | Sharma et al. | 375/259 |
| 5,826,673 | A | | 10/1998 | Bates et al. | 180/165 |
| 5,834,872 | A | * | 11/1998 | Lamb | 310/103 |
| 5,880,548 | A | * | 3/1999 | Lamb | 310/103 |
| 5,902,185 | A | * | 5/1999 | Kubiak et al. | 464/29 |
| 5,977,678 | A | * | 11/1999 | Miller et al. | 310/103 |
| 6,005,317 | A | * | 12/1999 | Lamb | 310/103 |
| 6,047,456 | A | * | 4/2000 | Yao et al. | 29/407.05 |
| 6,072,258 | A | * | 6/2000 | Lamb | 310/191 |
| 6,199,391 | B1 | * | 3/2001 | Link et al. | 62/133 |
| 6,200,426 | B1 | * | 3/2001 | Graf | 162/262 |
| 6,217,298 | B1 | * | 4/2001 | Klaui | 417/420 |
| 6,230,866 | B1 | * | 5/2001 | Link | 192/84.1 |
| 6,293,888 | B1 | * | 9/2001 | Moon | 475/210 |
| 6,336,878 | B1 | * | 1/2002 | Ehrlich et al. | 474/28 |
| 6,337,527 | B2 | * | 1/2002 | Lamb | 310/92 |
| 6,422,972 | B1 | * | 7/2002 | Eguchi | 477/107 |
| 6,544,019 | B2 | * | 4/2003 | Bohner et al. | 418/69 |
| 6,682,430 | B2 | * | 1/2004 | Killen | 464/29 |
| 6,731,038 | B2 | * | 5/2004 | Kuipers et al. | 310/90.5 |
| 6,762,523 | B1 | * | 7/2004 | Lisowski | 310/103 |
| 6,786,844 | B2 | * | 9/2004 | Fritzer et al. | 475/210 |
| 6,867,514 | B2 | * | 3/2005 | Fecera | 310/46 |

FOREIGN PATENT DOCUMENTS

| | | | | | |
|---|---|---|---|---|---|
| EP | 1069346 | A2 | * | 1/2001 | F16H 61/00 |
| EP | 1193426 | A2 | * | 4/2002 | F16H 61/38 |
| JP | 88057101 | | | 3/1988 | |
| JP | 63158345 | A | * | 7/1988 | F16H 03/66 |
| JP | 08035551 | A | * | 2/1996 | F16H 15/38 |
| JP | 10159925 | A | * | 6/1998 | F16H 15/38 |
| JP | 11210856 | A | * | 8/1999 | F16H 15/38 |
| JP | 2000314460 | A | * | 11/2000 | F16H 15/38 |
| WO | WO 9901681 | A1 | * | 1/1999 | F16H 37/08 |
| WO | WO 200025041 | A1 | * | 5/2000 | B60K 17/10 |
| WO | WO 200045068 | A1 | * | 8/2000 | F16H 21/46 |

OTHER PUBLICATIONS

Richard Truett, "Automakers gear up to launch CVT (continuously variable transmission) (Brief Article) (Statistical Dara Included)," *Automotive News,* Apr. 23, 2001, v75 i5926, p3, 3 pps.

Unknown, "Nissan Sentra CA & Extroid CVT Honored by Popular Science," *PR Newswire,* Nov. 9, 2000, p5003, 2 pps.

Walter Miller, "Japanese-style continuously variable transmission; there are no low-speed jerks and jolts with the CVT, says Subaru," *Popular Science,* Jan. 1985, v226 p62(1), 1 page.

Ron Grable, "The continuously variable transmission: minimum effort, maximum efficiency," *Motor Trend,* Dec. 1994 v46 n12 p118(1), 2 pps.

Steven Ashley, "Smoother shifting (automobile technology)," *Technology Review,* Apr. 1995 v98 n3 p15(3), 3 pps.

ORC Staff, "Shiftless Wonder! Honda's Continuously Variable Transmission," Off/Road.com, 2001, 6 pp.

Unknown, "Ford Media Site: Continuously Variable Transmission (CVT)," 2001, 1 page.

* cited by examiner

Figure 4A
Cross sectional view showing maximum magnetic coupling

Figure 4C
Magnet rotation

1 Input
2 Output
3 Fixed
4 Rotating
5 Timing
6 Gear

Figure 4B
Cross sectional view showing minimum magnetic coupling

1 Input Shaft
2 Output Shaft
3 Moving Magnets
4 Fixed Magnets

METHOD AND APPARATUS FOR A CONTINUOUSLY VARIABLE-RATIO TRANSMISSION

RELATED CASE

This application relates back to U.S. Provisional Patent No. 60/276,754, filed Mar. 16, 2001 entitled "Method and Apparatus for a Continuously Variable Transmission System."

BACKGROUND

Continuously Variable Transmissions (CVTs) have been known for some time. For automotive applications the prior art has primarily used completely mechanical means to achieve variable ratio transmissions. As shown in U.S. Pat. Nos. 4,548,100 and 4,630,504 conical-disc band mechanisms or variators (sliding belts) have been employed with limited success. Conventional mechanical variable ratio transmission designs suffer from the "point contact" problem—to achieve the variable gear ratio the torque is coupled through a very highly loaded small contact area or "point"—with attendant slippage and friction in the process. This problem exists in almost all completely mechanical non-geared designs. The result is increasingly high wear rates as the power capacity of the transmission increases as well as reduced efficiency. This typically results in marginally acceptable wear rates and lowered efficiency in moderate H.P. applications (125H.P.) and very short life or complete failure to function in high H.P. applications over 250H.P.

The prior art showing magnetically coupled transmissions such as U.S. Pat. Nos. 4,616,519 and 2,548,373 are either not true CVT's and or have serious problems generating the high torque levels suitable for automotive applications. Hybrid mechanical/magnetic CVT's have been show that address the slippage problems but usually require exotic magnetic fluids or have problems reliably actuating the electro-magnets.

DESCRIPTION OF THE FIGURES

The present invention is illustrated by way of example, and not by way of limitation, in the figures of the accompanying drawings and in which like reference numerals refer to similar elements and in which.

DESCRIPTION OF INVENTION

This disclosure describes a new type of Continuously Variable-ratio Transmission. Unlike all known true variable ratio transmissions the present invention uses magnetic means. This invention is not a magnetic clutch that can only couple from 0–100% of the input torque to the output, but is instead a true torque multiplying transmission. The transmission has the ability to multiply the input shaft torque on the output shaft in direct proportion to the RPM ratio of the input and output shaft, as in a normal "geared" transmission. In practical designs, the output torque can be as much as 20 times the input torque. The power is coupled by permanent magnets where the coefficient of coupling is commonly controlled by an electronic servo control loop.

Figure 1:
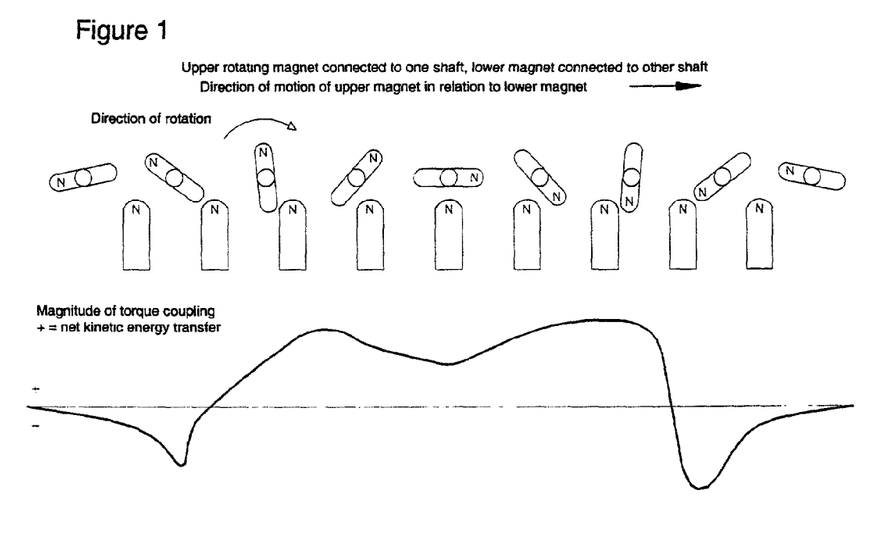
FIG. 1 is linear representation of magnet rotation and torque coupling showing an exemplary method of achieving imbalanced magnetic coupling.
Figure 2:
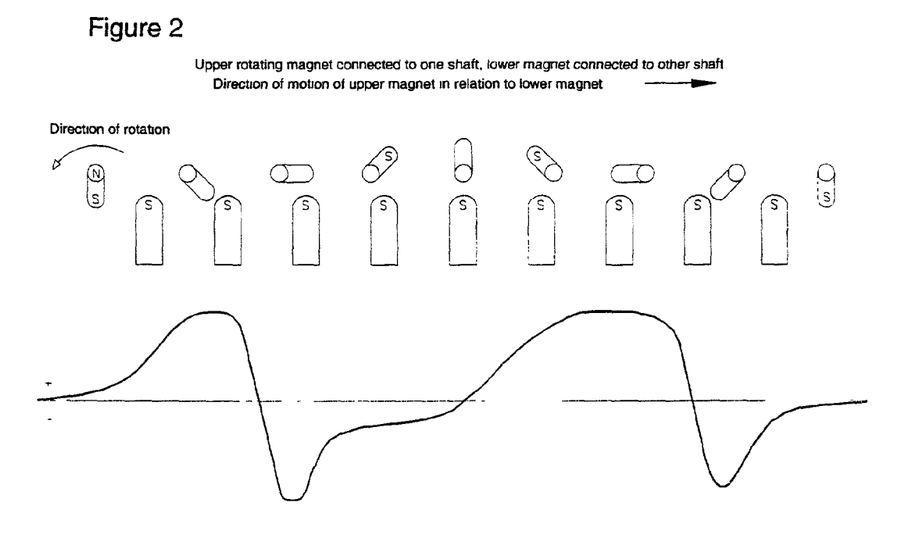
FIG. 2 is linear representation of magnet rotation and torque coupling showing another exemplary method of achieving imbalanced magnetic coupling.
Figure 3:
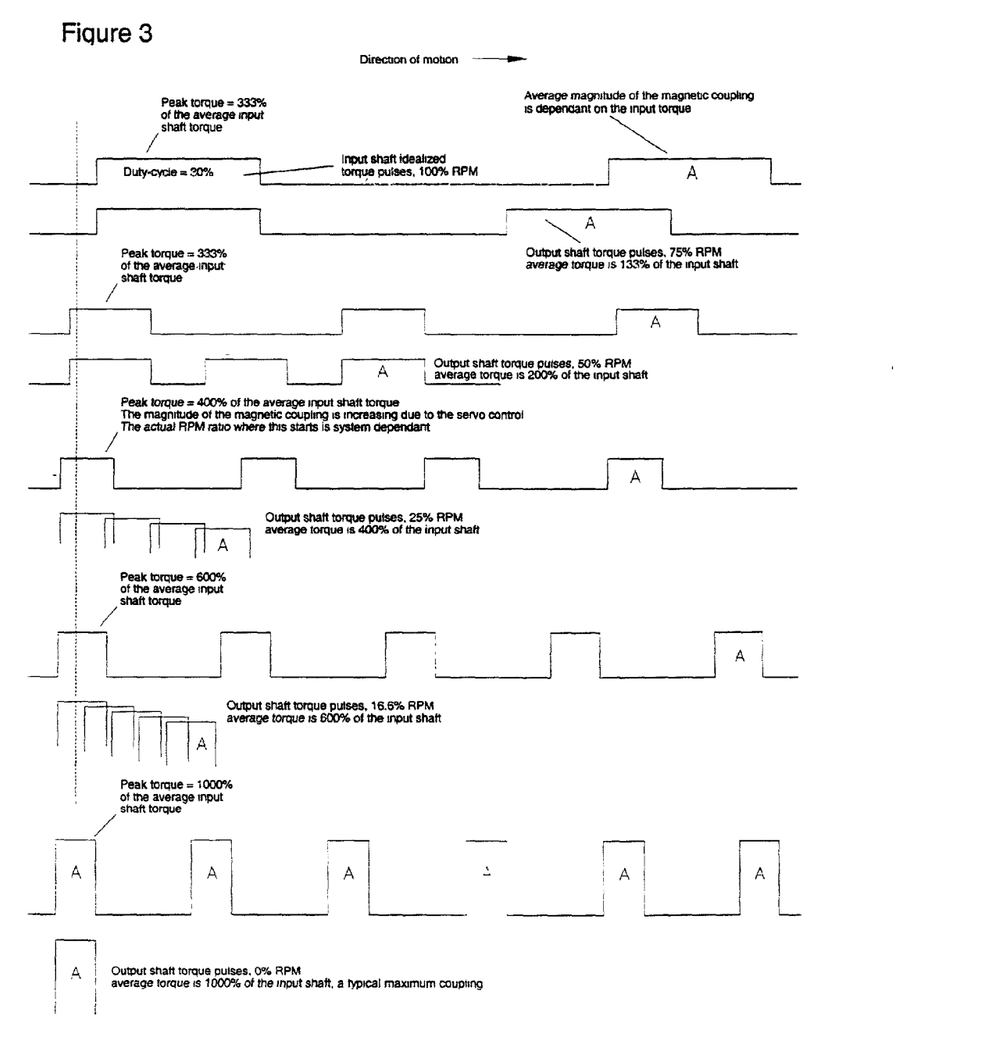
FIG. 3 is a linear representation of torque versus rpm ratio showing peak magnetic torque modulation change, controlled by the electronic servo loop, above 100% duty-cycle.
Figure 4A:
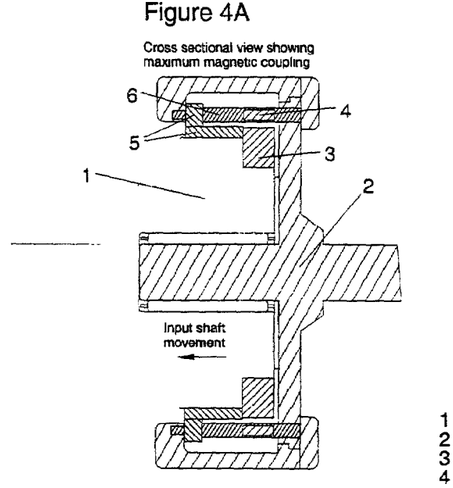
FIGS. 4A–D are various views of one embodiment of a simplified single pane implementation of a CVT.
Figures 4B, 4D:
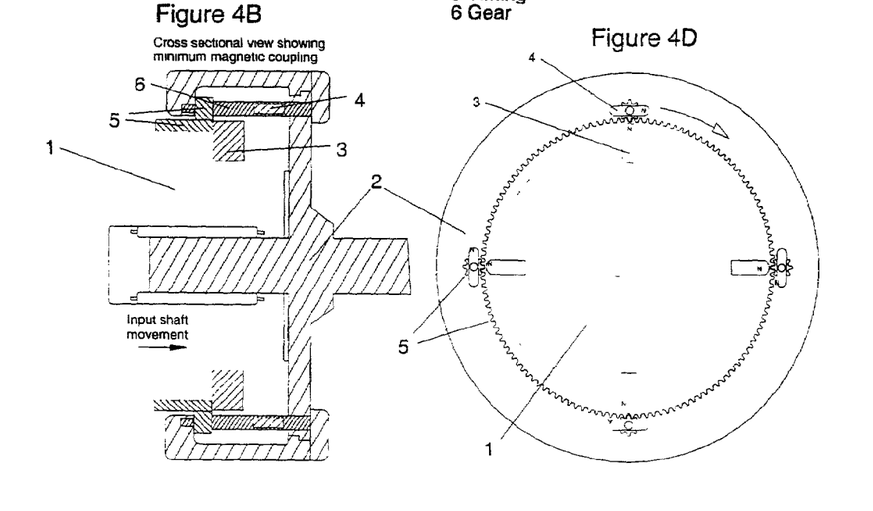
Figure 4C:
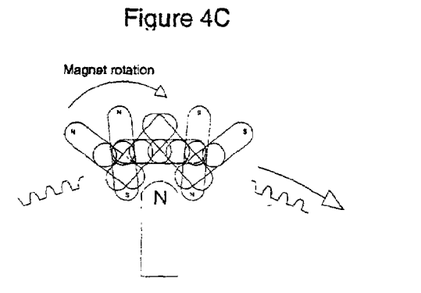
Figure 5A:
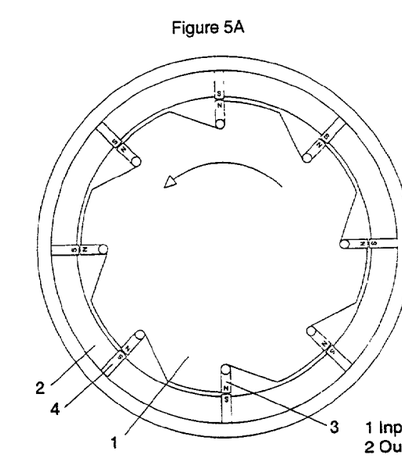
FIGS. 5A–D and 6A–D illustrate one embodiment of the CVT system at different stages of rotation.
Figure 5B:
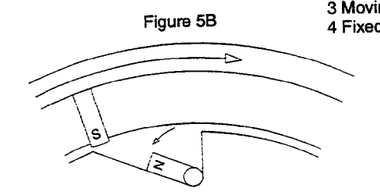
Figure 5C:
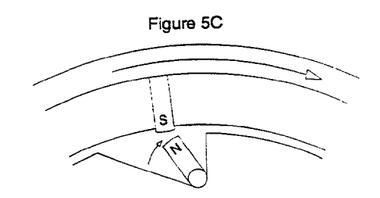
Figure 5D:
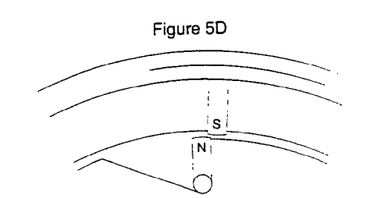
Figure 6A:
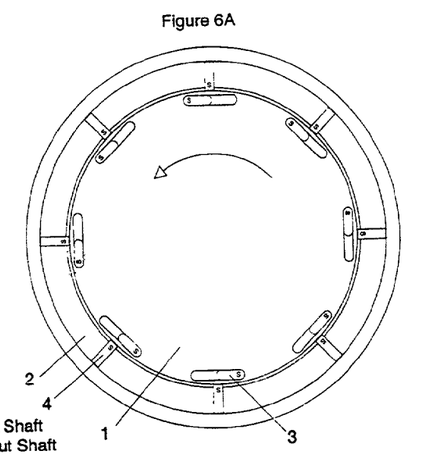
Figure 6B:
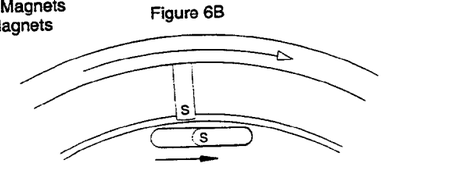
Figure 6C:
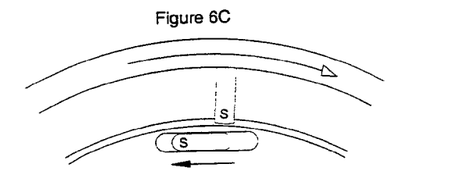
Figure 6D:
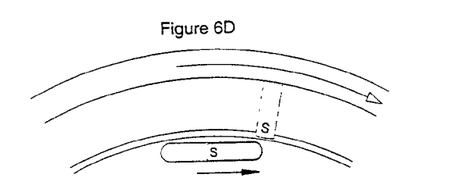
Figure 7:
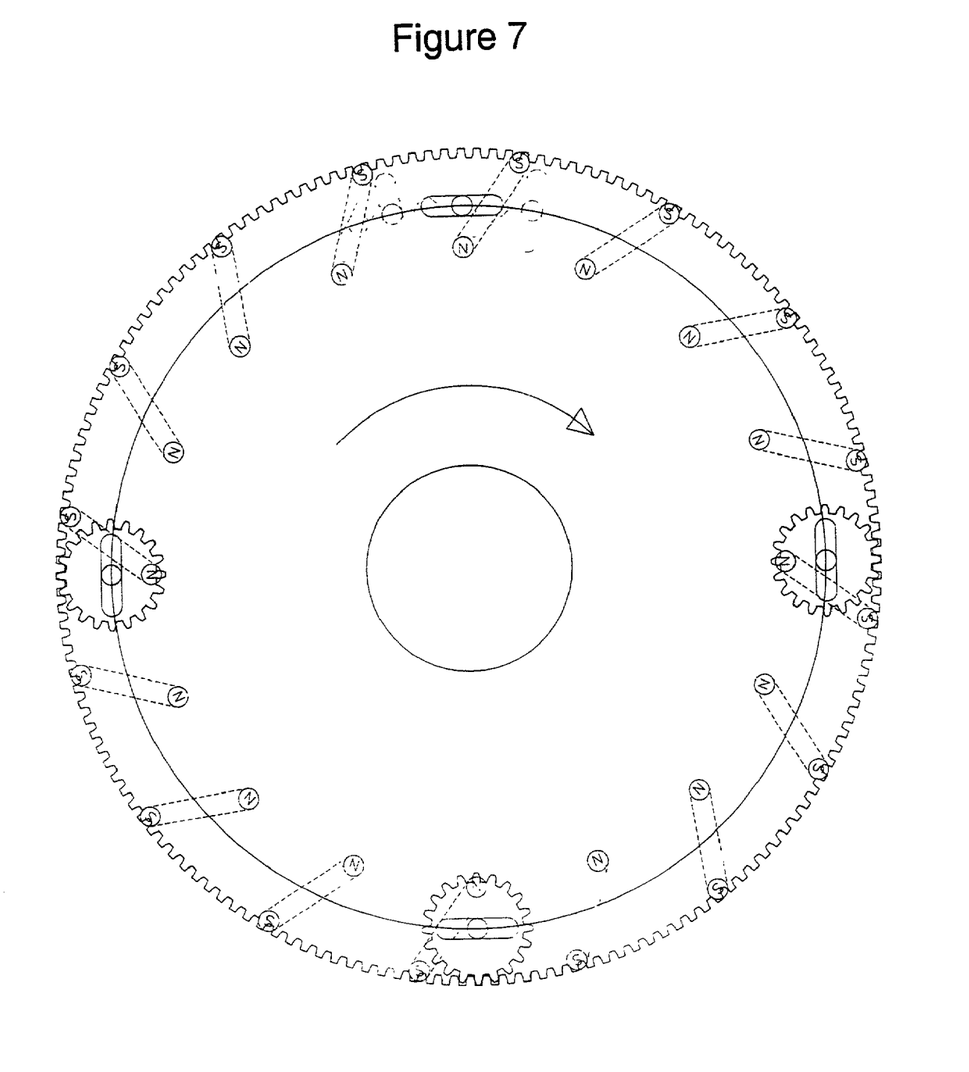
FIG. 7 illustrates one embodiment of a CVT system including magnets.

Torque multiplication is achieved by "duty-cycle" modulation of the magnetic coupling "pulses", between the input shaft and output shaft. This falls within the law of "conservation of energy", where the energy transfer in the magnetic coupling "pulses" is a fixed quantity (joules) regardless of the RPM ratio between the input and output shaft. This is only true up to the point where the magnetic coupling pulses on the input shaft reach 100% duty-cycle. Operation above this point is possible by simply increasing the magnitude of the magnetic coupling between the input and output shafts. This is typically accomplished by incorporating an electronic servo control loop that mechanically controls the magnitude of the magnetic coupling. In one variation the electronic servo control loop senses the input shaft RPM and adjusts the magnetic coupling to maintain the input shaft at a fixed RPM. As the output shaft RPM increases the magnitude of the magnetic coupling will decrease to compensate, thus maintaining the "conservation of energy" (diagram 3).

To keep the input and output shaft from prematurely "locking" or "stalling", the actual magnitude of the magnetic coupling between the input and output shafts is typically adjusted mechanically so that the average magnetic coupling does not exceed the available input shaft torque. As was shown previously, this is usually accomplished with an electronic servo control loop that senses the input shaft RPM and maintains it at a desired level by changing the magnetic coupling. For may applications it is not necessary to control the magnitude of the magnetic coupling, if the average magnetic coupling does not exceed the available input shaft torque. An other variation of this invention uses a servo control loop that maintains the torque ratio from the input shaft to the output shaft by sensing the input shaft RPM, torque and the output shaft RPM. It would adjust the magnetic coupling to maintain the input shaft to output shaft torque ratio proportional to the input shaft RPM divided by the output shaft RPM.

Another aspect of the invention is the fact that the magnetic coupling between the input and output shaft must be "imbalanced". As the magnets from the input shaft pass the magnets from the output shaft, the sum total of the "attraction" and "repulsion" forces must be other than zero (diagram 1 and 2). It can be a net attraction or repulsion between the two shafts. This disclosure shows several ways to implement this in FIGS. 1, 5, 6, 7 and 8. One set of variations works by rotating the magnets connected to one shaft in relation to the other shafts magnets. An other set of variations works by allowing the magnets connected to one shaft to "flap" or "slide" in relation to the other shafts magnets. Some variations allow for "duty-cycle" modulation of the output torque "dwell-time" thus increasing the effect of the variable magnetic coupling generated by the electronic servo control loop. As can be seen there are many different implementations for the magnetic coupling. It will require much research to determine the most efficient ways to do this.

Just like electric motors the transmission is infinitely scaleable. It could be used in something as small as an RC model, or a commercial aircraft, to the largest ships afloat. It is particularly suitable where constant input RPM is desired such as in hybrid gas-electric vehicles that are being developed now.

Figure 8:
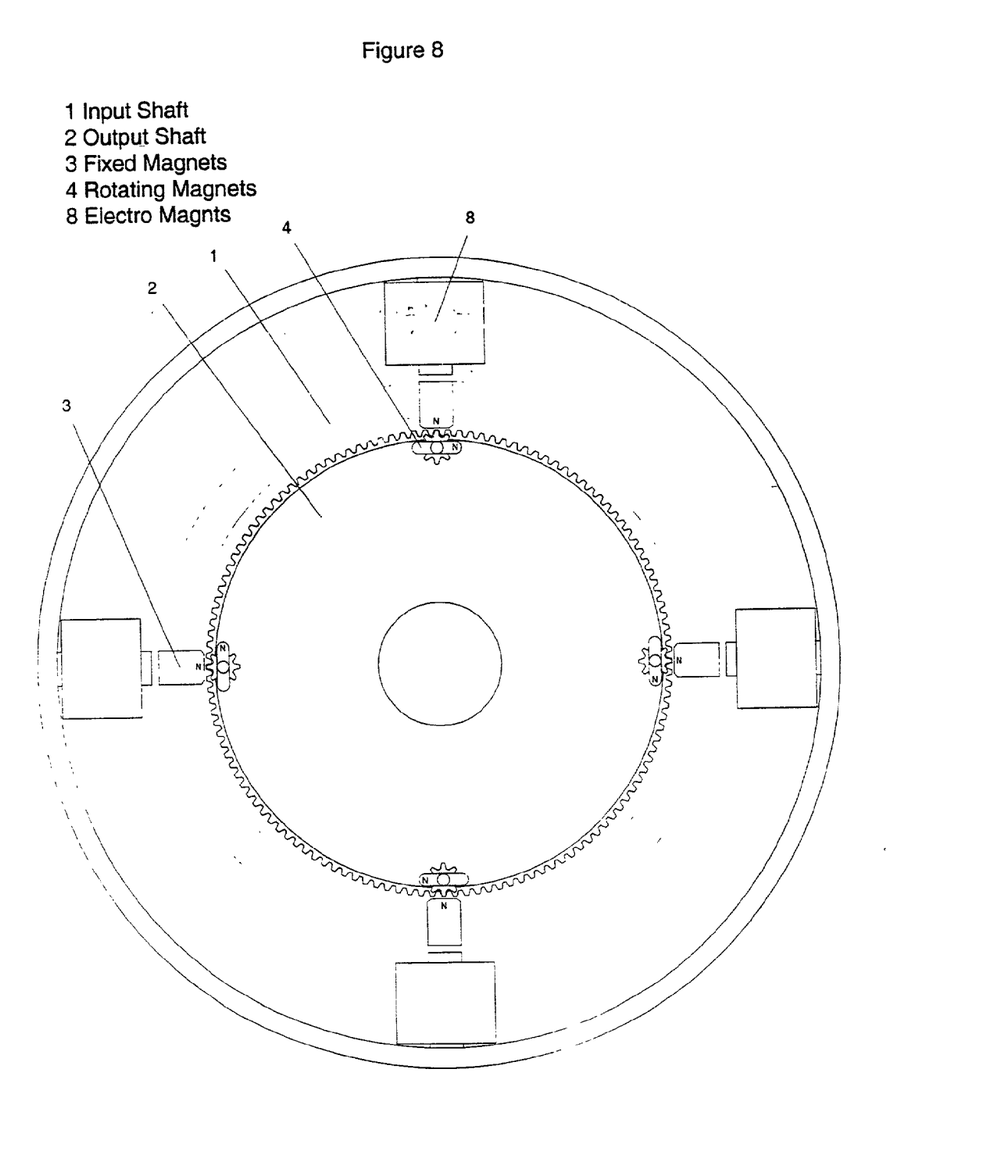
FIG. 8 illustrates one embodiment of a combination electric motor, gas engine starter/generator and variable ratio transmission.

Another aspect of the invention is the ability to easily incorporate a DC brushless electric motor. Since the transmission is fundamentally half of a DC brushless motor, it is easy to add the necessary windings to in fact make it a combination electric motor, gas engine starter/generator and variable ratio transmission (FIG. 8).

The opposite of the standard transmission scenario where the input RPM (engine) is held constant and the output RPM varies, is also possible by changing the electronic control loop. This mode where the input RPM varies and the output RPM is fixed is ideal for driving ancillary equipment that would otherwise rob power from an engine if run at RPM's higher than they need. In this mode the invention functions more like a high efficiency variable magnetic clutch.

The present invention works in speed reduction applications where the input RPM is generally fixed and the output RPM varies. Since the actual input RPM is electronically controlled it can be dynamically changed depending on the application. In a typical automotive application for example, there may be two RPM's that the engine would run at depending on whether the car is in a constant speed cruising mode or accelerating. The engine RPM in cruising mode would be chosen to achieve maximum fuel economy and in acceleration mode for maximum H.P. The fact that the transmission has an electronic control loop makes it easy to integrate into today's cars that have full engine management computer systems.

For automotive transmission use, the magnets would typically be made from Samarium/Cobalt or Neodymium/Iron. For other less demanding applications, the magnets could be made from less expensive materials. Using the highest performance rare earth magnets, a typical automotive transmission would be lighter than and about the same volume as an existing 5-speed transmission.

While this disclosure illustrates an efficient magnetic means to couple torque pulses between rotating shafts to obtaining torque multiplication, there are purely mechanical means to accomplish the same type of kinetic energy transfer, with typically lower efficiencies. Any non-geared mechanical type of "pulsed" kinetic energy transfer that achieves torque multiplication is also covered by this disclosure.

The present invention has the ability to efficiently multiply torque on the output shaft. On a per magnet basis, torque multiplication is accomplished by the transfer of kinetic energy stored in the input shaft assembly, to the output shaft assembly by magnetic coupled "pulses". The peak torque of the magnetic "pulses" is much greater than the average torque available on the input shaft. This is a function of the lateral magnet spacing or "duty-cycle" (diagram 3). As the input shaft assembly including the magnets accelerate, kinetic energy is stored. When the input shaft magnets line up with the output shaft magnets the magnetic coupling causes the input shaft to slow down thereby transferring kinetic energy to the output shaft, at a peak value much greater than the average. If the output shaft is rotating at a lower RPM than the input shaft, more of this "peak" torque is available on the output shaft and it's average torque will be greater than the torque on the input shaft. The instantaneous peak torque coupling between the input and output shaft is greater than the average input shaft torque and this peak torque is what is available on the output shaft. The torque "pulses" on the output shaft varies in direct proportion to RPM ratio of the input and output shafts.

The present system has a CVT, which has one or more of the following features:

Magnetically coupled;

Continuously variable ratio;

True torque multiplying by duty-cycle modulation of the magnetic coupling pulses;

Show method(s) for developing imbalanced magnetic coupling;

Infinitely scaleable;

Torque coupling can be electronically servo loop controlled from 0 to 100%;

Servo loop can be configured for different input or output shaft speed variations; and Can be easily integrated into a DC brushless motor/generator.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A continuously variable transmission (CVT) comprising:

an input shaft including a first set of magnets;

an output shaft including a second set of magnets, the input and output shaft rotating in the same direction at different speeds with the input shafts rotational speed greater than the output shafts as in a gear reduction application;

when the magnets of the input shaft come in close proximity to the magnets of the output shaft their magnetic fields interact via magnetic attraction and/or magnetic repulsion such that high amplitude pulses of kinetic energy are transferred from the input shaft to the output shaft as the magnets pass each other;

the average torque available on the output shaft is greater than the average torque available on the input shaft when the output shaft is rotating slower than the input shaft in a gear reduction application, and the sum of the period, amplitude, and frequency of the high amplitude pulses of kinetic energy exceeds the average torque available on the input shaft;

a flywheel coupled to the input shaft, the high amplitude pulses of kinetic energy are extracted from the flywheel, and the peak amplitude of the kinetic energy pulses exceeds the average torque available on the input shaft; and a moveable connection to connect a set of magnets to a shaft, such that the magnets move with respect to the shaft, optimizing the magnetic field interaction such that the sum of the attraction and repulsion forces are not zero, thereby providing a net transfer of kinetic energy from the input shaft to the output shaft.

2. The CVT of claim 1, further comprising:

gearing to couple the moveably connected magnets of one shaft to the other shaft in order to maintain a favorable timing relationship between the magnets on each shaft, to ensure the useful transfer of kinetic energy.

3. The CVT of claim 1, wherein a spacing of the magnets is such that the period or duty-cycle of the pulses is less than 50%.

4. The CVT of claim 1, further comprising:
the first set of magnets being distributed around a circumference of the inner shaft in a regular pattern; and
the second set of magnets being distributed around a circumference of the outer shaft in a regular pattern;
such that the impulses coupled by the magnets are regular.

5. The CVT of claim 1, further comprising:
an electronic servo control loop to maintain an optimum torque couple coefficient between the input and the output shafts by sensing a ratio of the input shaft to the output shaft rotational speeds, and affecting an amplitude of the coupling pulses between the input and the output shafts.

6. The CVT of claim 5, wherein the amplitude of the coupling pulses are modified by mechanically affecting the distance between the input shaft magnets and the output shaft magnets.

7. The CVT of claim 6, wherein the magnetic coupling is affected by laterally moving the input shaft in relation to the output shaft.

8. The CVT of claim 7, further comprising:
a mechanical assembly to laterally move the input shaft in relation to the output shaft, to control the amplitude of the coupling pulses.

9. The CVT of claim 1, further comprising:
electromagnets coupled to the periphery of the input shaft, in close proximity to permanent magnets attached to the input shaft, the electromagnets used to a incorporate a DC brushless motor into the CVT.

10. A continuous variable transmission (CVT) capable of torque multiplication in a gear reduction mode comprising:
an input shaft including a first set of magnets;
an output shaft including a second set of magnets, a set of the magnets being moveably coupled to the shaft;
the input shaft magnetically coupled to the output shaft to transfer pulsed kinetic energy as the first set of magnets passes the second set of magnets, the pulses of kinetic energy are of a short duration in relation to the rotational time of the input shafts, with a duty-cycle of typically less than 50%; and the instantaneous peak torque of the pulses is typically more than two times the average torque that is available on the input shaft;
a flywheel attached to the input shaft, to supply instantaneous torque pulses coupled from the input shaft to the output shaft in nearly direct proportion to the ratio of the speeds of the shafts;
wherein the average torque on the output shaft exceeds the average available torque on the input shaft and the net kinetic energy available on the output shaft is less than the net kinetic energy available on the input shaft.

11. The CVT of claim 10, wherein variable torque multiplication is achieved when either the amplitude or duty-cycle of the pulsed kinetic energy is varied.

12. The CVT of claim 10, further comprising:
a plurality of permanent magnets coupled to the input shaft; and
a plurality of permanent magnets coupled to the output shaft.

13. The CVT of claim 10, further comprising:
an electronic servo control loop to adjust a magnitude of the pulses of kinetic energy coupled from the input shaft to the output shaft based on a ratio of the input shaft to output shaft rotational speeds to maintain an optimum torque couple coefficient between the input and output shafts.

14. A continuous variable transmission (CVT) capable of torque multiplication in a gear reduction mode comprising:
a first shaft including a first set of permanent magnets;
a second shaft including a second set of permanent magnets, the shafts rotating with respect to each other;
a set of permanent magnets movably coupled to a shaft, such that each permanent magnet of the set of permanent magnets moves about an axis other than a rotational axis of the shafts as the magnets pass each other;
wherein torque multiplication is achieved based on an amplitude of the magnetically coupled pulses between the first shaft and the second shaft.

15. The CVT of claim 14, further comprising:
a flywheel attached to the first shaft, to supply instantaneous torque pulses coupled from the first shaft to the second shaft in nearly direct proportion to the ratio of the speeds of the shafts.

16. The CVT of claim 14, wherein the moveable coupling comprises a sliding coupling, such that the magnets slide with respect to the shaft thereby varying the amplitude of the magnetically coupled pulses.

17. The CVT of claim 14, further comprising:
gearing to couple the moveably connected magnets of one shaft to the other shaft in order to maintain a favorable timing relationship between the magnets on each shaft.

18. The CVT of claim 10, further comprising:
a moveable connection to connect a set of magnets to a shaft, such that the magnets move with respect to the shaft, about an axis other than a rotational axis of the shaft.

* * * * *